March 20, 1928.
G. R. HOUGHTALING
BELT BUCKLE
Filed April 5, 1927
2 Sheets-Sheet 1
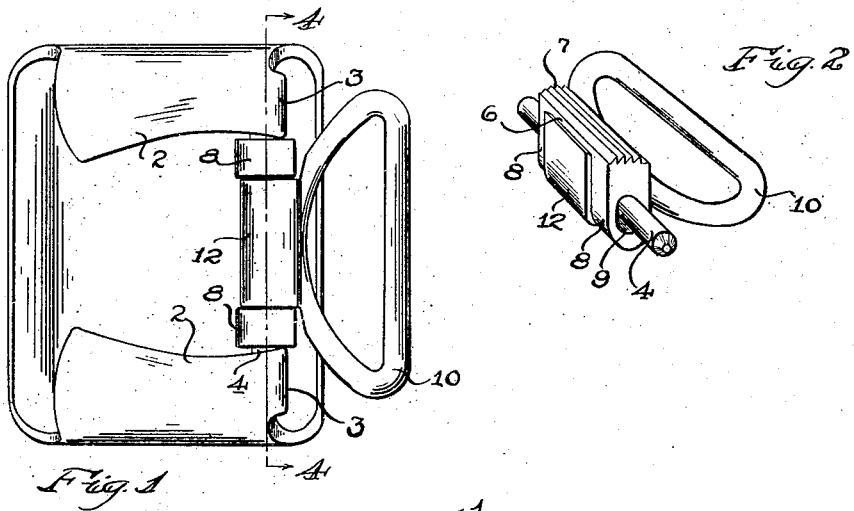
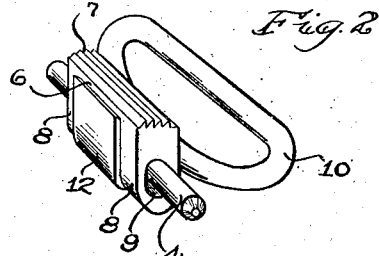
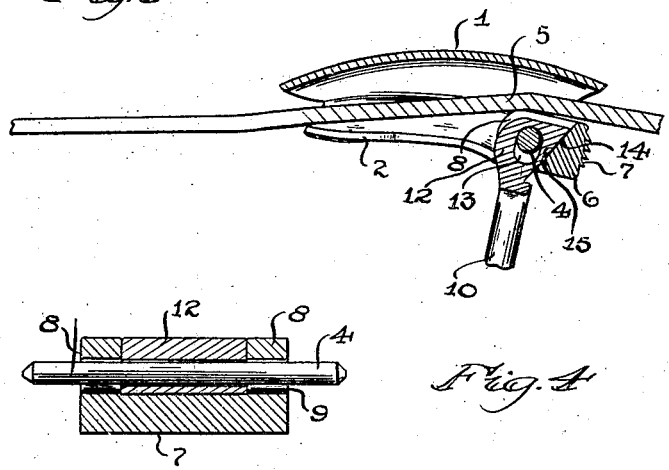
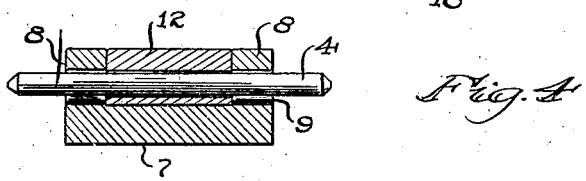
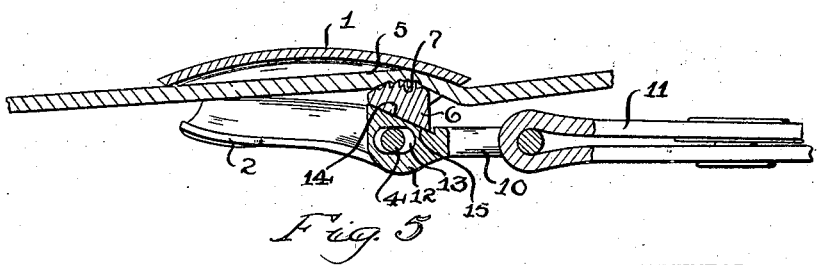
INVENTOR
Guy R. Houghtaling
BY
his ATTORNEY March 20, 1928.

G. R. HOUGHTALING

BELT BUCKLE

Filed April 5, 1927

INVENTOR
Guy R. Houghtaling
BY
his ATTORNEY

Patented Mar. 20, 1928.

1,663,006

UNITED STATES PATENT OFFICE.

GUY R. HOUGHTALING, OF ROCHESTER, NEW YORK, ASSIGNOR TO HICKOK MANUFACTURING COMPANY, INC., OF ROCHESTER, NEW YORK, A CORPORATION OF NEW YORK.

BELT BUCKLE.

Application filed April 5, 1927. Serial No. 181,187.

The present invention relates to belt buckles and more particularly to the type in which there is provided a clamping member movable to cooperate with a clamping surface on the buckle frame. An object of this invention is to provide a clamping member moved toward the clamping surface of the buckle frame by the movement of a belt anchoring member which moves under the tension of the belt in a line at an angle to the line of movement of the clamping member under the action of two bevelled faces lying at a slight angle to the line of movement of the belt anchoring member. Another object of this invention is to mount the clamping member so that it may move transversely of the swinging axis of the clamping member so as to adapt the buckle to belts of different thicknesses, provision being made whereby an anchoring member for one end of the belt may be utilized for swinging the clamping member about its axis and also for effecting the movement of the clamping member transversely of its axis. A further object of the invention is to provide a belt buckle having a pivot bar on which a clamping member and a belt anchoring member are both anchored to turn and also to slide transversely thereof, cooperating portions being provided on the anchoring member and the clamping member whereby the tension of the belt on the anchoring member tends to maintain the clamping member in engagement with the other end of the belt.

To these and other ends this invention consists of certain parts and combinations of parts all of which will be hereinafter described; the novel features being pointed out in the appended claims.

In the drawings

Fig. 1 is a rear view of a belt buckle constructed in accordance with this invention;

Fig. 2 is a perspective view showing the clamping member and the belt anchoring member mounted on the pivot pin or bar;

Fig. 3 is a sectional view through the belt buckle showing the clamping member moved to free the belt;

Fig. 4 is a section on the line 4—4, Fig. 1;

Fig. 5 is a sectional view showing the clamping member in clamping relation with the belt;

Figure 6:
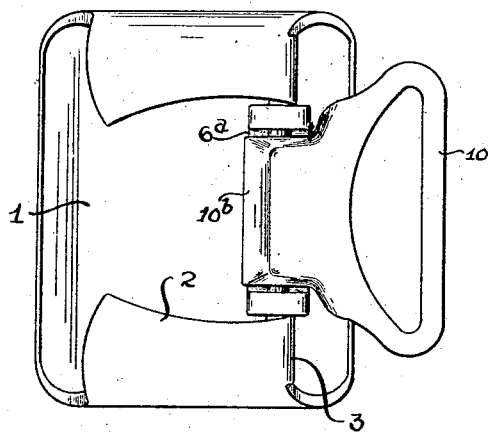
Fig. 6 is a rear view of another embodiment of the invention in which the clamping member and the belt anchoring member are formed from sheet metal stampings.

Referring to the illustrated embodiment of the invention, 1 indicates the face plate of a buckle frame which has flanges 2 turned inwardly over the rear face of the plate in spaced relation to such face, these flanges being rolled at 3 about the ends of a pivot pin or bar 4 which extends between the flanges 2. The rear face of this face plate 1 serves as a clamping face for one end 5 of a belt.

The clamping member 6, in this instance, has a serrated face 7 and at each end is provided with arms 8 formed with slots 9 through which the pivot pin or shaft extends. This connection permits the clamping member not only to swing on the pivot pin 4 as an axis but also to move transversely of said axis in order that the clamping member may adapt itself to belts of different thicknesses.

The control of the clamping member is effected in this instance by a belt and anchoring member such as the loop 10 about which the belt end 11 is passed, said loop having at its inner end a bar 12 formed with a slot 13 through which the pivot bar 4 for the clamping member extends. This slot permits the belt anchoring member to swing on the bar about the axis formed by the bar 4 and also to move transversely of said axis.

With the end in view of controlling the clamping member 6 from the belt end anchoring member, cooperating portions are provided between the belt end anchoring member and the clamping member, these portions being so formed that the clamping member is caused to swing with the belt anchoring member about the axis formed by the bar 4 while at the same time the tension on the belt anchoring member 10 will hold the clamping member 6 in firm engagement with the belt end 5 notwithstanding the thickness of such belt end. This connection is such, in this instance, that the two devices namely the clamping member 6 and the belt anchoring member 10 must turn together on the shaft or rod 4 but each may move on the rod, transversely of the axis an amount determined by the thickness of a belt end 5 held between the clamping member 6 and the clamping surface on the rear side of the front plate 1. The cooperating surfaces, in this instance, comprise a flat beveled face 14 on the clamping member 6 between the two arms 8 and a flat beveled surface 15 on the bar 12, these surfaces being at a slight angle to the direction or pull or tension on the anchoring member 10 so that the greater the tension on the anchoring member, the greater will be the pressure of the clamping member on the belt end 5. A shoulder 16 on the anchoring member assists in preventing the clamping member swinging relatively to the belt anchoring member.

Figure 7:
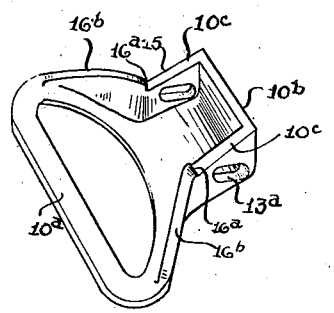
Fig. 7 is a perspective view of the belt anchoring member illustrated in Fig. 6.
Figure 8:
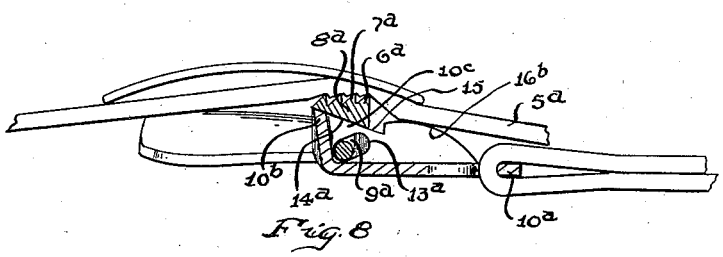
Fig. 8 is a central section through that embodiment of the buckle illustrated in Fig. 6.
Figure 9:
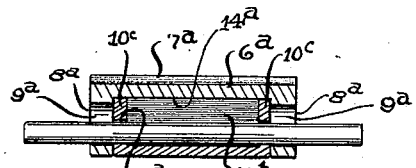
Fig. 9 is a sectional view through the clamping member and the anchoring member showing them mounted upon the pivot pin.
Figure 10:
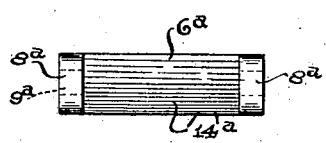
Fig. 10 is a detail view of the clamping member.

In the embodiment of the invention illustrated in Figs. 6 to 10 inclusive, the buckle frame 1 is the same as that shown in Fig. 1 and has inwardly turned flanges 2 on its rear face provided with roll portions 3 for securing the pivot pin 4. The clamping member 6ª is provided with arms 8ª bent from the material of the clamping member and formed with slots 9ª. The serrated face 7ª is formed on the upper surface of the connecting portion between the arms 8ª while the under side of this connecting portion is beveled at 14ª.

The belt anchoring member is also made from sheet metal to provide a loop 10ª and a substantially box like member projecting from the loop formed by an end wall 10ᵇ and two side walls 10ᶜ. The side walls 10ᶜ are provided with slots 13ª which are at slight angles to the plane of the loop 10ª. The top surfaces of the end wall 10ᵇ and sides 10ᶜ are beveled at 15 and cooperate with the under surface 14ª of the clamping member. It will be noted that the slots 13ª and the slots 8ª receive the pivot pin 4 and that the slots 8ª which extend transversely of the slot are at slight angles to the line of pull on the belt anchoring loop 10ª. The shoulders 16ª assist in preventing relative turning between the clamping member and the belt anchoring member. Beyond the shoulders 16ª and on the loop side of the pivot of the belt anchoring member 10ª the latter is provided with portions 16ᵇ which are adapted to cooperate with the belt end 5ª beyond the part engaged by the clamping member in order to prevent the limit of the swinging action of the clamping member. This is particularly desirable when thin belts are used as the clamping member will swing beyond its clamping point before the action of the belt anchoring member on the clamping member becomes effective.

From the foregoing it will be seen that there has been provided a belt buckle in which the belt anchoring member and the clamping member swing about a common axis, both members also having movement transversely of said axis, and cooperating portions whereby tension on the belt anchoring member moves the clamping member a distance transversely of the axis determined by the thickness of the belt. The clamping member and the belt anchoring member turn together on a common axis for moving the clamping surface into and out of cooperative relation with the clamping surface on the buckle frame and at the same time the clamping member and the belt anchoring member are movable transversely of said axis to accommodate belts of different thicknesses. The cooperating beveled surfaces on the clamping member and the belt anchoring member prevents any relative swinging movement between the two parts, and this swing is further prevented by the shoulder on the belt anchoring member.

What I claim as my invention and desire to secure by Letters Patent is:

1. A belt buckle comprising a buckle frame having a clamping surface, a pin supported on the frame in spaced relation to the clamping surface, a clamping member mounted to turn on said pin and also to move transversely thereof, a belt anchoring member mounted to turn on said pin and also to move transversely thereof, and cooperating portions on the belt anchoring member and the clamping member for effecting the movement of the clamping member toward the clamping surface when tension is placed on the belt anchoring member.

2. A belt buckle comprising a buckle frame having a clamping surface thereon, a clamping member and a belt anchoring member both mounted to swing on the frame about a common axis, and each mounted to move transversely of said axis on lines at angles to each other, and cooperating portions on the clamping member and the belt anchoring member for effecting the movement of the clamping member transversely of the axis when the belt anchoring member is moved transversely on said axis by tension thereon.

3. A belt buckle comprising a buckle frame having a clamping surface thereon, a pin supported in spaced relation to said clamping surface, a clamping member mounted to turn on the pin and also to move transversely thereof, a belt anchoring member mounted to turn on the pin and also to move transversely thereof, and cooperating beveled surfaces on the clamping member and the belt anchoring member arranged at a slight angle to the line of movement of the belt anchoring member so that the tension on the belt anchoring member tends to move the clamping member toward the clamping surface on the buckle frame.

4. A belt buckle comprising a buckle frame having a clamping surface thereon, a pivot bar supported in spaced relation to the clamping surface, a clamping member having two slotted arms through which a pivot bar extends, said clamping member having a beveled surface between the slotted arms, and a belt anchoring member having a slotted portion through which the pivot bar extends, such slotted portion lying between the two slotted arms of the clamping member and having a beveled portion cooperating with the beveled portion on the clamping portion.

5. A belt buckle comprising a buckle frame having a clamping surface, a pin supported on the frame in spaced relation to the clamping surface, a clamping member mounted to turn on said pin and also to move transversely thereof, a belt anchoring member mounted to turn on said pin and also to move transversely thereof, and cooperating portions on the belt anchoring member and the clamping member for effecting the movement of the clamping member toward the clamping surface when tension is placed on the belt anchoring member, and a portion on the belt anchoring member to one side of the pivot of the latter for cooperating with the belt end engaged by the clamping member to limit the swinging movement of the clamping member.

6. A belt buckle comprising a buckle frame having a clamping surface thereon, a clamping member and a belt anchoring member both mounted to swing on the frame about a common axis, and each mounted to move transversely of said axis on lines at angles to each other, cooperating portions on the clamping member and the belt anchoring member for effecting the movement of the clamping member transversely of the axis when the belt anchoring member is moved transversely on said axis by tension thereon, and a portion on the belt anchoring member to one side of the pivot of the latter for cooperating with the belt end engaged by the clamping member to limit the swinging movement of the clamping member.

7. A belt buckle comprising a buckle frame having a clamping surface thereon, a clamping member pivotally mounted on the frame and movable also transversely of its pivotal axis, a belt anchoring member pivotally mounted on the frame and also movable transversely of its pivotal axis, and cooperating portions on the belt anchoring member and the clamping member for moving the latter about its axis and also transversely of its axis.

GUY R. HOUGHTALING.